United States Patent
Durand et al.

(10) Patent No.: US 10,454,075 B2
(45) Date of Patent: Oct. 22, 2019

(54) POWER UNIT USING FLEXIBLE CONDUCTIVE MEMBER

(71) Applicant: STMicroelectronics (Tours) SAS, Tours (FR)

(72) Inventors: Alexis Durand, Tours (FR); Franck Dosseul, Fondettes (FR)

(73) Assignee: STMicroelectronics (Tours) SAS, Tours (FR)

( * ) Notice: Subject to any disclaimer, the term of this patent is extended or adjusted under 35 U.S.C. 154(b) by 77 days.

(21) Appl. No.: 15/893,107

(22) Filed: Feb. 9, 2018

(65) Prior Publication Data

US 2018/0166659 A1 Jun. 14, 2018

Related U.S. Application Data

(62) Division of application No. 14/681,237, filed on Apr. 8, 2015, now Pat. No. 9,923,176.

(51) Int. Cl.
*H01M 2/02* (2006.01)
*H01M 10/04* (2006.01)
*H01M 2/04* (2006.01)
*H01M 2/22* (2006.01)

(52) U.S. Cl.
CPC ....... *H01M 2/0202* (2013.01); *H01M 2/0478* (2013.01); *H01M 2/22* (2013.01); *H01M 10/0436* (2013.01); *H01M 2220/30* (2013.01)

(58) Field of Classification Search
CPC .......................... H01M 2/0202; H01M 2/0478

USPC ...................................................... 429/127
See application file for complete search history.

(56) References Cited

U.S. PATENT DOCUMENTS

| | | | |
|---|---|---|---|
| 6,146,225 A | 11/2000 | Sheats et al. | |
| 7,486,019 B2 | 2/2009 | Padiyath et al. | |
| 2007/0290049 A1 | 12/2007 | Ratcliffe | |
| 2014/0147719 A1 | 5/2014 | Robin et al. | |

FOREIGN PATENT DOCUMENTS

CN 101490879 A 7/2009

OTHER PUBLICATIONS

First Office Action and Search Report for co-pending CN Appl. No. 201510860098.2 dated Mar. 2, 2018 (8 pages).

*Primary Examiner* — Bryan D. Ripa
*Assistant Examiner* — James M Erwin
(74) *Attorney, Agent, or Firm* — Crowe & Dunlevy

(57) ABSTRACT

An electronic device includes a flexible conductive member having a first length, and a battery substrate having a second length shorter or equal than the first length. There is an active battery on the battery substrate. An adhesive layer couples the active battery and the battery substrate to the flexible conductive member such that the active battery and the flexible conductive member are electrically coupled, and such that the flexible substrate encapsulates the active battery and the upper portion of the battery substrate without an intervening layer. The flexible conductive member includes an insulating flexible base layer having a conductive via formed therein. Upper and lower metallized layers are formed on the insulating flexible base layer and are electrically coupled to one another by the conductive via.

18 Claims, 5 Drawing Sheets

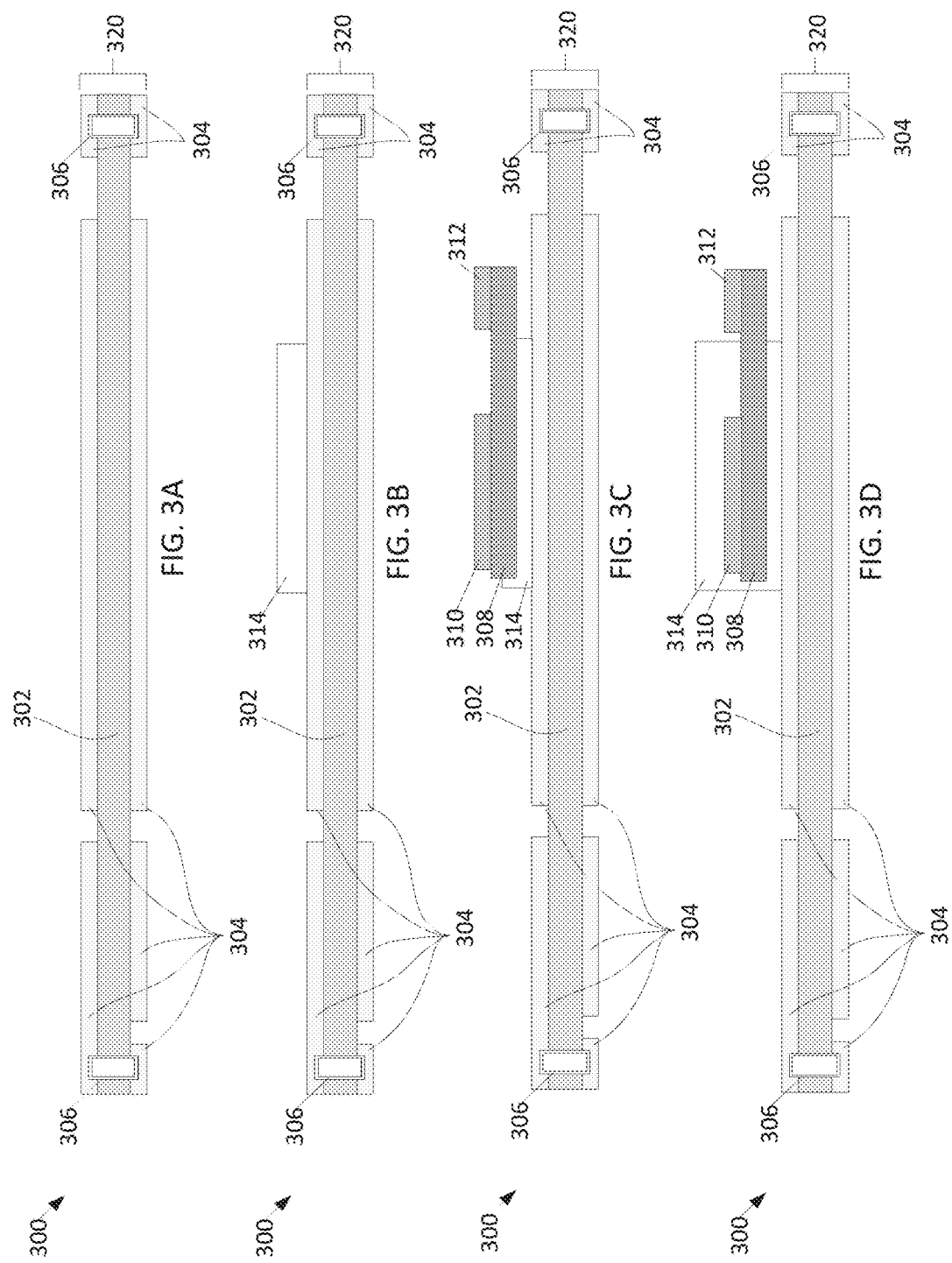

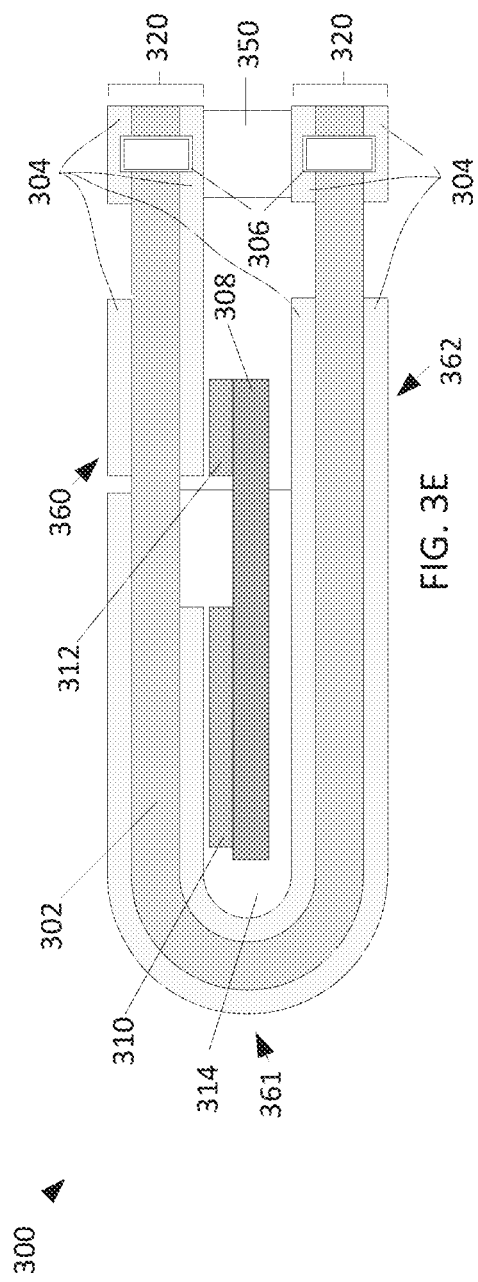

POWER UNIT USING FLEXIBLE CONDUCTIVE MEMBER

CROSS-REFERENCE TO RELATED APPLICATIONS

This application is a divisional application from U.S. patent application Ser. No. 14/681,237 filed Apr. 8, 2015, the disclosures of which are hereby incorporated by reference.

TECHNICAL FIELD

This disclosure relates to the field of battery technology, and more particularly, to power units employing flexible conductive members for protection against environmental ingress or to fit within desired form factors.

BACKGROUND

Portable electronic devices such as laptops, smartphones, tablets, and cameras are popular with consumers. These electronic devices are powered by batteries, or power units. Due to a consumer desire for such electronic devices to be as thin and light as reasonably possible, internal components are grouped tightly together. As such, there may be form factor constraints for power units that are difficult to achieve. In addition to these form factor constraints, consumers also desire for such electronic devices to have a degree of resistance to water or moisture.

However, current power unit technology is rigid, making the conformation to form factor constraints difficult in some situations. Moreover, additional coating layers are typically used for current power units so as to provide the desired water and moisture resistance, which serves to add to the difficulty with meeting form factor constraints as it adds thickness to a power unit.

Consequently, further development of power unit technology that can address the dual desires for fitting within desired form factors, as well as resisting water and moisture without making the fitting within desired form factors more difficult, is desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is an electronic device including a flexible conductive member having a first length, and a battery substrate having a second length shorter than or equal to the first length.

An active battery is on the battery substrate, and an adhesive layer couples the active battery and the battery substrate to the flexible conductive member such that the active battery and the flexible conductive member are electrically coupled, and such that the flexible substrate encapsulates the active battery and the upper portion of the battery substrate without an intervening layer The active battery may include a metallic lithium layer, and the adhesive layer may directly contact the metallic lithium layer without an intervening mica substrate layer. The active battery may be formed on an upper portion of the battery substrate, and the flexible conductive member may directly encapsulate the active battery and upper portion of the battery substrate without an intervening mica substrate layer. An encapsulating layer may encapsulate the lower portion of the battery substrate.

The flexible conductive member has an insulating flexible base layer with a conductive via formed therein, and upper and lower metallized layers formed on the insulating flexible base layer and that are electrically coupled to one another by the conductive via.

The flexible conductive member includes an insulating flexible base layer having conductive vias formed therein, and an upper metallization layer formed on an upper portion of the insulating flexible base layer. The upper metallization layer includes an upper metallized anode conductor layer formed on the upper portion of the insulating flexible base layer, and an upper metallized cathode conductor layer formed on the upper portion of the insulating flexible base layer. A lower metallization layer is formed on a lower portion of the insulating flexible base layer. The lower metallization layer includes a lower metallized anode conductor layer formed on the lower portion of the insulating flexible base layer, and a lower metallized cathode conductor layer formed on the lower portion of the insulating flexible base layer. The conductive vias of the insulating flexible base layer electrically couple the upper metallized anode conductor layer to the lower metallized anode conductor layer, and the upper metallized cathode conductor layer to the lower metallized cathode conductor layer.

The flexible conductive member may be constructed from a material selected from the group consisting of polyimide, polyethylene terephthalate, and polyethylene naphthalate.

The active battery may be formed on an upper portion of the battery substrate. In addition, the flexible conductive member may be bent so as to have a first portion adjacent the active battery and the upper portion of the battery substrate, a second portion adjacent a lower portion of the battery substrate, and a curved portion extending between the first and second portions. An additional adhesive layer may couple the first and second portions of the flexible conductive member together at portions thereof that extend beyond the battery substrate.

The first portion of the flexible conductive member, curved portion of the flexible conductive member, additional adhesive layer, and second portion of the flexible conductive member may the battery substrate and active battery. The encapsulation may environmentally seal the active battery from oxygen and water ingress.

The active battery may be formed on an upper portion of the battery substrate, and the flexible conductive member may be adjacent the active battery and upper portion of the battery substrate. An additional flexible conductive member may be adjacent a lower portion of the battery substrate such that the battery substrate is sandwiched between the flexible conductive member and additional flexible conductive member. An additional adhesive layer may couple the flexible conductive member and additional flexible conductive member together at portions thereof that extend beyond the battery substrate.

The active battery may be formed on an upper portion of the battery substrate, and the flexible conductive member may be adjacent the active battery and the upper portion of the battery substrate. A device substrate may carry the battery substrate such that a lower portion of the battery substrate is in contact with the device substrate. The flexible conductive member may be bent such that the flexible conductive member is in contact with the device substrate.

The active battery may be formed on the upper portion of the battery substrate in an inert atmosphere, and the active battery and battery substrate may be adhesively coupled to the lower metallized layer of the flexible substrate in the inert atmosphere.

The active battery may be formed on the upper portion of the battery substrate in an inert atmosphere, and a passivation layer may be formed to encapsulate the active battery after formation of the active battery on the upper portion of the battery substrate.

A method aspect is directed to a method of forming a flexible conductive member by forming conductive vias in an insulating flexible base layer, and forming an upper metallized layer on an upper portion of the insulating flexible base layer and being electrically coupled to the conductive vias. A lower metallized layer is formed on a lower portion of the insulating flexible base layer and being electrically coupled to the conductive vias such that the lower metallized layer and upper metallized layer are electrically coupled. An active battery is formed on an upper portion of a battery substrate. The active battery and battery substrate are adhesively coupled to the lower metallized layer of the flexible substrate such that the active battery and lower metallized layer are electrically coupled, and such that the flexible substrate encapsulates the active battery and the upper portion of the battery substrate without an intervening layer.

The method may also include bending a portion of the flexible conductive member that protrudes beyond the battery substrate in a U-shape such that the lower metallized layer is also adjacent a lower portion of the battery substrate, and adhesively coupling the lower metallized layer to the lower portion of the battery substrate.

An open end of the u-shape of the flexible conductive member may be sealed such that the flexible conductive member and sealing encapsulate the battery substrate and active battery. The encapsulation may environmentally seal the active battery from oxygen and water ingress.

The method may also include adhesively coupling a lower portion of the battery substrate to a device substrate, bending a portion of the flexible conductive member that protrudes beyond the battery substrate such that the portion is adjacent the device substrate, and adhesively coupling the portion of the flexible conductive member that protrudes beyond the battery substrate to the device substrate such that the flexible conductive member is in a bent shape.

BRIEF DESCRIPTION OF THE DRAWINGS

FIGS. 3A-3D are a cutaway view of the electronic device as it is constructed in accordance with methods of this disclosure.

FIG. 3E is a cutaway view of an electronic device in accordance with this disclosure after being folded to seal against environmental ingress.

DETAILED DESCRIPTION

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
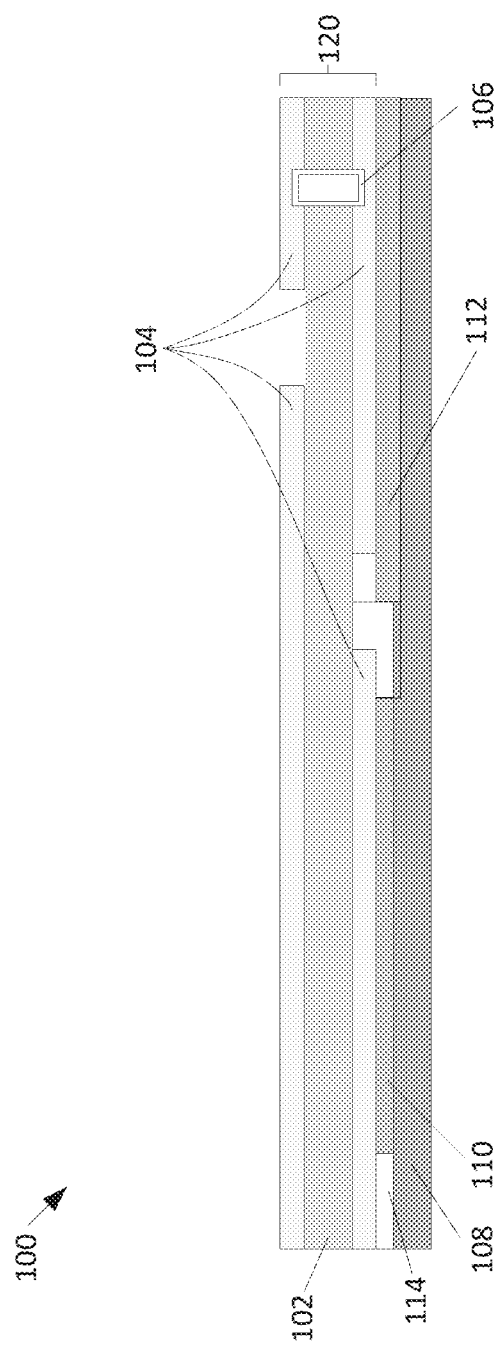
FIG. 1 is a cutaway view of an electronic device in accordance with this disclosure.
Figure 1A:
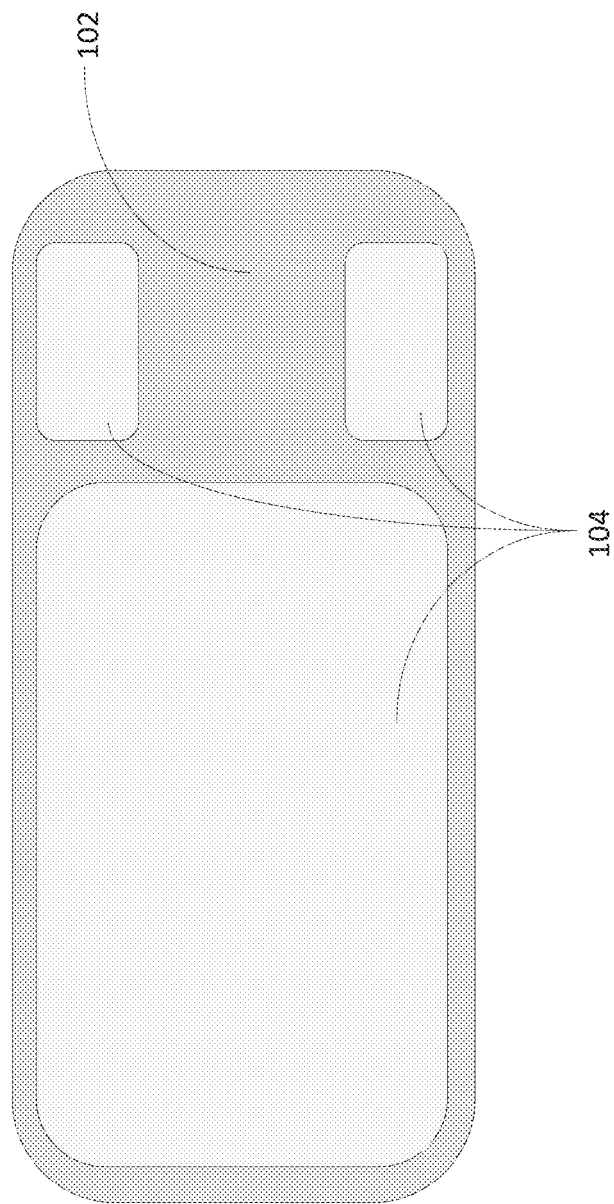
FIG. 1A is a top plan view of the electronic device of FIG. 1.

With reference to FIGS. 1-1A, a power unit 100 is now described. The power unit 100 is for powering a portable electronic device such as a laptop, smartphone, tablet, or camera. Structure of the power unit 100 will now be described.

The power unit 100 includes a flexible conductive member 120, which is constructed from an insulating flexible base layer 102 having upper and lower metallized layers 104 formed on respective upper and lower sides thereof. A conductive via 106 is formed in the insulating flexible base layer 102, and serves to electrically connect the upper and lower metallized layers 104. The power unit 100 also includes a battery substrate 108 having an active battery 110 formed thereon, as well as terminals 112 including the anode and cathode of the battery. The upper and lower metallization layers 104 each function as part of a barrier against $H_2O$ and $O_2$, as well as include respective cathode and anode conductor portions to be coupled to the cathode and anode at the terminals 112. An adhesive layer 114 adhesively couples the active battery 110 and battery substrate 108 to the insulating flexible base layer 102 at the lower portion thereof so that the flexible conductive member 120 and battery substrate 108 serve to encapsulate the active battery 110 against $H_2O$, $O_2$, and other environmental contaminants. The terminals 112 are electrically coupled to the lower metallization layer 104, and through the conductive via 106, also to the upper metallization layer 104.

The insulating flexible base layer 102 is constructed from a film, such as polyimide, polyethylene terephthalate, or polyethylene naphthalate, at a thickness of 50 to 100 micrometers. The upper and lower metallized layers 104 are constructed from a metal such as copper or aluminum, at a thickness of about 2 to 35 micrometers, with a finishing of nickel, gold, palladium, or tin, at a thickness 0.05-10 micrometers. The upper and lower metallized layers 104 serve to help prevent passage of oxygen and water therethrough. The battery substrate 108 is the carrier of the layer for the active battery 110 and can be made from mica, while the active battery 110 is formed from lithium, lithium phosphorous oxy-nitride, or lithium cobalt oxide. The cathode and anode of the terminals 112 are constructed from lithium cobalt oxide or platinum. The adhesive layer 114 is an insulating adhesive, such as polyvinylidene chloride or epoxy. It should be appreciated that while materials have been listed above for the insulating flexible base layer 102, metallized layers 104, battery substrate 108, active battery 110, cathode and anode of the terminals 112, and adhesive layer 114, other suitable materials may be utilized and are within the scope of this disclosure, as long as the metallization layer 104 forms a suitable barrier to oxygen and moisture.

It should be noted that there is no intervening protective layer between the flexible conductive member 120 and the active battery 110, which are either in direct contact, or coupled by the adhesive layer 114. Due to the encapsulation of the active battery 110, such an intervening protective layer (e.g. mica foil) is not needed.

Figure 2:
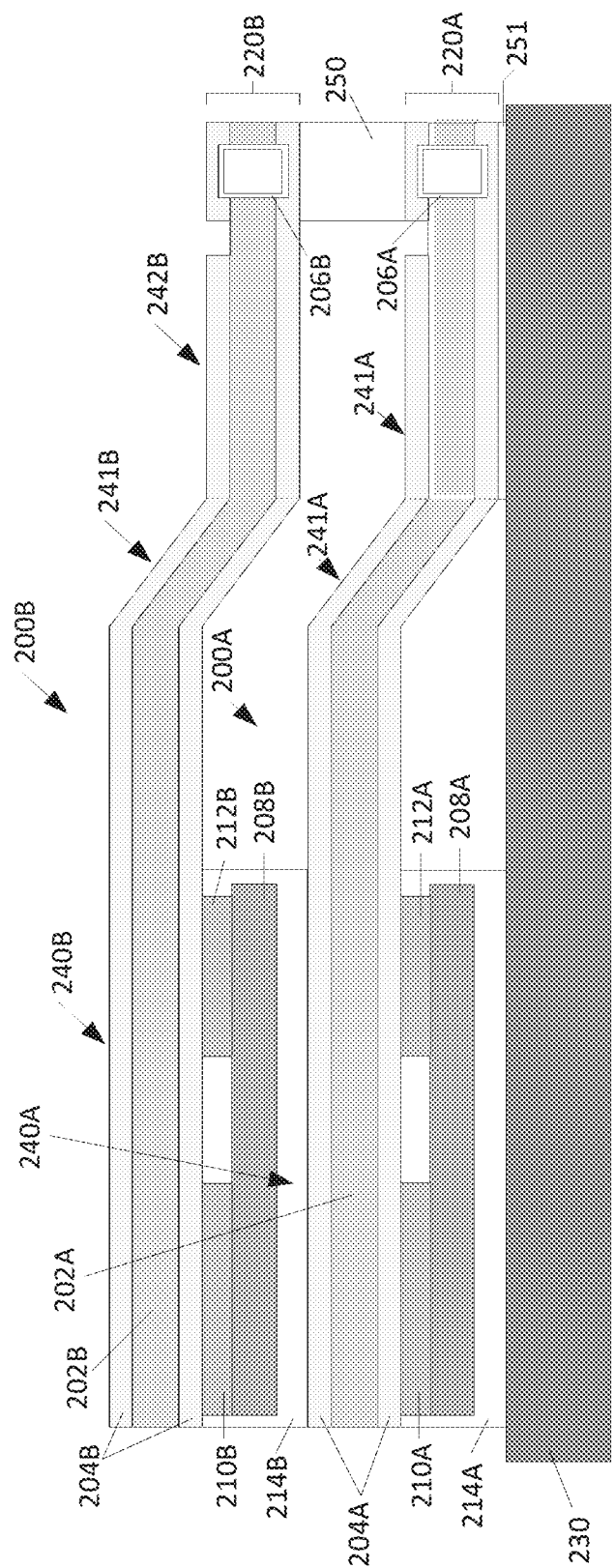
FIG. 2 is a cutaway view of an electronic device having stacked power supply units in accordance with this disclosure.

As illustratively shown in FIG. 1, the insulating flexible base layer 102 is equal in length to the battery substrate 108. However, in some applications, the insulating flexible base layer 102 may be greater in length than the batter substrate such that it protrudes beyond the battery substrate 108. This would advantageously allow the arrangement of the power cell 100 into different configurations, one of which is now described with reference to FIG. 2.

As shown, a first power cell 200A is carried by a device substrate 230. The lower portion of the battery substrate 208A is adhesively coupled to the device substrate 230 via the adhesive layer 214A, such that a first portion 240A of the flexible conductive member 220A is spaced apart from the device substrate 230. A lower portion of the second portion 242A of the flexible conductive member 220A that protrudes beyond the battery substrate 208A is adhesively coupled to the device substrate 230 by an adhesive layer 251, such that the flexible conductive member 220A is bent at an intermediate portion 241A so as to define an offset between parallel axes of the first and second portions 240A, 242A of the flexible conductive member 220A.

A second power cell 200B is carried by the first power cell 200B, with the lower portion of the battery substrate 208B being adhesively coupled to the upper portion of the flexible conductive member 220A such that a first portion 240B of the flexible conductive member 220B is spaced apart from the flexible conductive member 220A.

A lower portion of a second portion 242B of the flexible conductive member 220B that protrudes beyond the battery substrate 208B is adhesively coupled to the flexible conductive member 220A by an adhesive layer 250, such that the flexible conductive member 220B is bent at an intermediate portion 241B so as to define an offset between parallel axes of the first and second portions 240B, 242B of the flexible conductive member 220B.

The adhesive 250 is conductive, such that the lower metallized layer 204B of the second power cell 200B is electrically coupled to the upper metallized layer 204A of the first power cell 200A. This allows coupling of the first and second power cells 200A, 200B either in parallel or series as desired.

In this configuration, the flexibility of the flexible conductive members 220A, 220B allows their stacking to be compact and to take up less room inside of a portable electronic device than previous designs. This allows the design of either smaller portable electronic devices, or the saving of space inside a portable electronic device for other components.

As will be explained with reference to FIG. 3E, the flexible conductive member 320 can be bent about the battery substrate 308 so as to enclose the battery substrate 308 and active battery 310 in a U-shape, and the open end of the U-shape may be sealed by an adhesive 350, thereby sealing the active battery 310 from ingress of environmental elements, such as oxygen and water.

With reference to the series of power cells 300 shown in FIGS. 3A-3D, formation of the power cell 300 is now described. Starting with FIG. 3A, the flexible conductive member 320 is constructed by first forming an insulating flexible base layer 302, and then forming conductive vias 306 in the insulating flexible base layer 302. The metallized layers 304 are then formed on the insulating flexible base layer 302, for example by lithography, such that they are electrically coupled via the conductive vias 306.

Moving to FIG. 3B, an adhesive layer 314 is deposited on the upper metallized layer 304. Then, in FIG. 3C, an active battery 310 and cathode and anode for terminals 312 are formed on a battery substrate 308. It should be noted that the active battery 310 is formed in a controlled inert atmosphere, such as nitrogen. The battery substrate 308 is then adhesively coupled to the upper metallized layer 304. Since the active battery 310 is unprotected prior to the adhesive coupling to the upper metallized layer 304, that adhesive coupling may be performed in the controlled inert atmosphere. Alternatively, a passivation layer may be formed on the active battery 310 prior to the adhesive coupling, such that adhesive coupling need not be performed in the inert atmosphere. The passivation layer may be $Al_2O_3$, formed via atomic layer deposition.

Thereafter, in FIG. 3D, additional adhesive 314 is deposited on the battery substrate 308 and active battery 310. As shown in FIG. 3E, the flexible conductive member 320 is then bent about the about the battery substrate 308 so as to enclose the battery substrate 308 and active battery 310 in a u-shape, and the open end of the U-shape is sealed by an adhesive 350, thereby sealing the active battery 310 from ingress of environmental elements, such as oxygen and water. Forming this U-shape results in a first portion 360 of the flexible conductive member 320 being adhesively coupled to the active battery 310, terminals 212, and upper portion of the battery substrate 308, and a second portion 362 of the flexible conductive member 320 being adhesively coupled to a bottom portion of the battery substrate 308. The lower metallized layer 304 of the first portion 360 is coupled to the lower metallized layer 304 of the second portion 362 (which, due to the U-shape, faces the lower metallized layer 304 of the first portion 360) via conductive adhesive 350.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A method, comprising:
   forming a flexible conductive member by:
       forming conductive vias in an insulating flexible base layer,
       forming an upper metallized layer on an upper portion of the insulating flexible base layer and being electrically coupled to the conductive vias, and
       forming a lower metallized layer on a lower portion of the insulating flexible base layer and being electrically coupled to the conductive vias such that the lower metallized layer and upper metallized layer are electrically coupled;
   forming an active battery on an upper portion of a battery substrate; and
   mounting the active battery and battery substrate to the lower metallized layer of the flexible conductive member with an adhesive such that the active battery and lower metallized layer are electrically coupled, and such that the adhesive and the flexible conductive member encapsulates the active battery and the upper portion of the battery substrate.

2. The method of claim 1, wherein forming the active battery comprises forming in an inert atmosphere; and wherein adhesively coupling comprises adhesively coupling in said inert atmosphere.

3. The method of claim 1, wherein forming the active battery comprises forming in an inert atmosphere; and further comprising forming a passivation layer encapsulating the active battery after formation of the active battery on the upper portion of the battery substrate.

4. The method of claim 1, further comprising bending a portion of the flexible conductive member that protrudes beyond the battery substrate in a U-shape such that the lower metallized layer is also adjacent a lower portion of the battery substrate, and attaching the lower metallized layer to the lower portion of the battery substrate with a further adhesive.

5. The method of claim 4, further comprising sealing an open end of the U-shape of the flexible conductive member such that the flexible conductive member and sealing encapsulate the battery substrate and active battery.

6. The method of claim 5, wherein the encapsulation environmentally seals the active battery from oxygen and water ingress.

7. The method of claim 1, further comprising:
adhesively coupling a lower portion of the battery substrate to a device substrate;
bending a portion of the flexible conductive member that protrudes beyond the battery substrate such that the portion is adjacent the device substrate;
adhesively coupling the portion of the flexible conductive member that protrudes beyond the battery substrate to the device substrate such that the flexible conductive member is in a bent shape.

8. A method, comprising:
forming a flexible conductive member by:
forming conductive vias in an insulating flexible base layer,
forming an upper metallized layer on an upper portion of the insulating flexible base layer and being electrically coupled to the conductive vias, and
forming a lower metallized layer on a lower portion of the insulating flexible base layer and being electrically coupled to the conductive vias such that the lower metallized layer and upper metallized layer are electrically coupled;
forming an active battery having a first face mounted to a first surface of a battery substrate, the active battery including first and second battery terminals exposed on a second face of the active battery opposite the first face of the active battery; and
mounting the active battery and battery substrate to the lower metallized layer of the flexible conductive member with an adhesive such that the active battery and lower metallized layer are electrically coupled, and such that the adhesive and the flexible conductive member encapsulates the active battery and the first surface of the battery substrate.

9. The method of claim 8, wherein forming the active battery comprises forming in an inert atmosphere; and wherein adhesively coupling comprises adhesively coupling in said inert atmosphere.

10. The method of claim 8, wherein forming the active battery comprises forming in an inert atmosphere; and further comprising forming a passivation layer encapsulating the active battery after formation of the active battery on the upper portion of the battery substrate.

11. The method of claim 9, further comprising bending a portion of the flexible conductive member that protrudes beyond the battery substrate in a U-shape such that the lower metallized layer is also adjacent a lower portion of the battery substrate, and attaching the lower metallized layer to the lower portion of the battery substrate with a further adhesive.

12. The method of claim 11, further comprising sealing an open end of the U-shape of the flexible conductive member such that the flexible conductive member and sealing encapsulate the battery substrate and active battery.

13. The method of claim 12, wherein the encapsulation environmentally seals the active battery from oxygen and water ingress.

14. The method of claim 9, further comprising:
adhesively coupling a lower portion of the battery substrate to a device substrate;
bending a portion of the flexible conductive member that protrudes beyond the battery substrate such that the portion is adjacent the device substrate;
adhesively coupling the portion of the flexible conductive member that protrudes beyond the battery substrate to the device substrate such that the flexible conductive member is in a bent shape.

15. An electronic device, comprising:
a device substrate;
a plurality of power units carried by the device substrate in a stacked arrangement;
each power unit comprising:
a flexible conductive member having a first portion, a second portion, and an intermediate offset defining portion connecting the first portion and the second portion,
a battery substrate,
an active battery formed on the battery substrate, and
an adhesive layer coupling the active battery and the battery substrate to the first flexible conductive member such that the active battery and the flexible conductive member are electrically coupled, and such that the flexible conductive member encapsulates the active battery and the battery substrate.

16. The electronic device of claim 15, wherein each power unit is electrically coupled in series with adjacent power units.

17. The electronic device of claim 15, wherein each power unit is electrically coupled in parallel with adjacent power units.

18. The electronic device of claim 15, wherein the flexible conductive member is constructed from a material selected from the group consisting of polyimide, polyethylene terephthalate, and polyethylene naphthalate.

* * * * *